(12) United States Patent
Pesme et al.

(10) Patent No.: US 9,242,315 B2
(45) Date of Patent: Jan. 26, 2016

(54) DEVICE FOR CENTERING AND CLAMPING TUBULAR PARTS

(75) Inventors: François Pesme, Villers Cotterets (FR); Denis Destouches, Dampleux (FR); Jean-François Dagenais, Cassis (FR)

(73) Assignee: SERIMAX NORTH AMERICA, Houston, TX (US)

( * ) Notice: Subject to any disclaimer, the term of this patent is extended or adjusted under 35 U.S.C. 154(b) by 176 days.

(21) Appl. No.: 11/865,132

(22) Filed: Oct. 1, 2007

(65) Prior Publication Data

US 2009/0085269 A1 Apr. 2, 2009

(51) Int. Cl.
*B23K 37/053* (2006.01)
*B23K 101/10* (2006.01)

(52) U.S. Cl.
CPC ................... *B23K 37/0531* (2013.01)

(58) Field of Classification Search
CPC .... B23K 20/126; B23K 37/04; B23K 37/053; B23K 37/0531; B23K 9/0052; B23K 9/0282; B23K 9/0284; B23K 2201/06; B23K 2201/10

USPC .............. 228/212, 213, 44.3, 44.5, 49.1, 49.3
See application file for complete search history.

(56) References Cited

U.S. PATENT DOCUMENTS

| | | | | |
|---|---|---|---|---|
| 3,425,614 | A * | 2/1969 | Clark | 228/49.3 |
| 5,288,005 | A * | 2/1994 | Beakley et al. | 228/49.3 |
| 6,398,100 | B1 * | 6/2002 | Radbourne et al. | 228/44.5 |
| 6,915,943 | B2 * | 7/2005 | Laing | B23K 37/0531 228/212 |
| 2008/0217378 | A1 * | 9/2008 | Richard et al. | 228/102 |

FOREIGN PATENT DOCUMENTS

| | | | | |
|---|---|---|---|---|
| EP | 0 767 719 B | 9/1999 | | |
| EP | 1123774 | 8/2001 | | |
| WO | WO 2006123070 A1 * | 11/2006 | | B23K 9/028 |

\* cited by examiner

*Primary Examiner* — Aaron Austin
*Assistant Examiner* — Megha Mehta
(74) *Attorney, Agent, or Firm* — Oblon, McClelland, Maier & Neustadt, L.L.P.

(57) ABSTRACT

A device for centering and internal clamping of tubular parts such as metal conduits, placed end-to-end so as to be welded to form metal pipelines is provided.

12 Claims, 2 Drawing Sheets

DEVICE FOR CENTERING AND CLAMPING TUBULAR PARTS

BACKGROUND AND SUMMARY OF THE INVENTION

This invention relates to a device for centering and internal clamping of tubular parts such as metal conduits, placed end-to-end so as to be welded to form metal pipelines.

In the welding of these conduits, it is essential for the axes of said conduits to be properly aligned and for the aligned conduits to be held during the welding. Indeed, if there is poor alignment of the axes, the assembly seal between conduits is then irregular, which from the perspective of quality of the welding performed, can lead to defects. A centering and clamping device therefore makes it possible to align the conduits in preparation for welding and to maintain this alignment during welding. Such devices are described in particular in EP 1123774 and EP 0767719.

A device of this type is conventionally made of an elongate cylinder that has clamping means, such as front and rear clamping shoes, placed on the entire periphery and arranged so as to project radially from said cylinder so as to come into contact with the walls of the conduits to be clamped, which device is capable of also comprising drive means enabling it to move inside the conduits once the welding has been completed.

Such devices require the use of a handle or a rope for controlling, moving and positioning the device at the ends of the conduits to be welded. Such a handle must in particular be caught on leaving the conduit in formation so as to be inserted into the new conduit to be welded.

Thus, document U.S. Pat. No. 6,915,943 proposes an internal centering and clamping device that is controlled by a diesel engine that actuates a hydraulic pump so as to cause the operation of the hydraulic equipment of the device, such as clamping shoes, cylinders enabling deployment of the wheels, and the brakes. A control unit is provided on such a device and comprises a radio receiver that can receive control signals resulting in electrical control commands so as to actuate the hydraulic and electrical components of the device. A remote control unit is then provided, which enables an operator to transmit, by radio, to the control panel of the device, the various orders relating to the operation of the device, in particular forward and backward movement orders for its proper positioning. Thus, with these radio transceivers, the device no longer needs a handle or a rope to move, position or cause the operation of the device. In addition, the time needed to position and actuate said device is advantageously reduced.

Such a device is indeed advantageous, but it has a disadvantage in that it uses hydraulic control equipment and a thermal engine. Indeed, with hydraulic control systems, if the medium used is leading to oil leakages, it may be necessary to redo the welding.

In devices in which the equipment is pneumatically controlled, the handle, while having a handling disadvantage, has a notable advantage in that it enables a simple connection between the tank of the device and the compressor of the welding station.

To overcome the aforementioned disadvantages, this invention proposes a device for centering and clamping tubular parts such as conduits intended to form pipelines, of the type constituted by an elongate cylinder that contains in particular clamping means, so that at least two series of clamping shoes, placed on the entire periphery and arranged to project radially from said cylinder so as to come into contact with the walls of the conduits to be clamped, as well as means for driving each series of clamping shoes between a position of projection from the cylinder and a position in which they are hidden in the cylinder, wherein said drive means can be actuated by pneumatic control means. The cylinder comprises, in the front portion, means for connection to complementary connection means provided at the end of a flexible conduit connected to an external compressor, for supplying compressed air to a tank provided in said device, which means are of the rapid safety connection type.

Thus, advantageously, a pneumatically controlled centering and clamping device is obtained without requiring the connection of said device to a compressor of the welding station by means of a rigid bar, with the tank enabling the pneumatic control while the connection means of the rapid safety connection type and the flexible conduit enable simple and reliable filling of said tank when necessary.

The connection means provided on the device are preferably constituted in part by the male fitting and the female fitting of the rapid safety connection, and the other being provided at the end of a flexible pipe constituting a flexible supply line from the compressor unit. This flexible supply line, constituted by the flexible pipe conduit, makes it possible to eliminate many constraints associated in particular with the rigidity of the bar previously used.

Also advantageously, the centering and clamping device according to the invention no longer requires the presence of a rigid handle, as was the case previously. Consequently, it is possible to provide means for radio control of said device. Thus, the device according to the invention can advantageously comprise a control unit comprising at least one radio receiver for receiving radio control signals transmitted from a remote control unit.

The device according to the invention is very advantageously simpler to use because it can be controlled remotely without any risk for the operators, while ensuring optimal pneumatic operation by the connection means of the rapid safety connection provided at the end of a flexible pipe so as to enable the tank of the device to be refilled.

BRIEF DESCRIPTION OF THE DRAWINGS

We will now describe the invention in greater detail in reference to the drawing, in which.

DETAILED DESCRIPTION OF THE INVENTION

Figure 1:
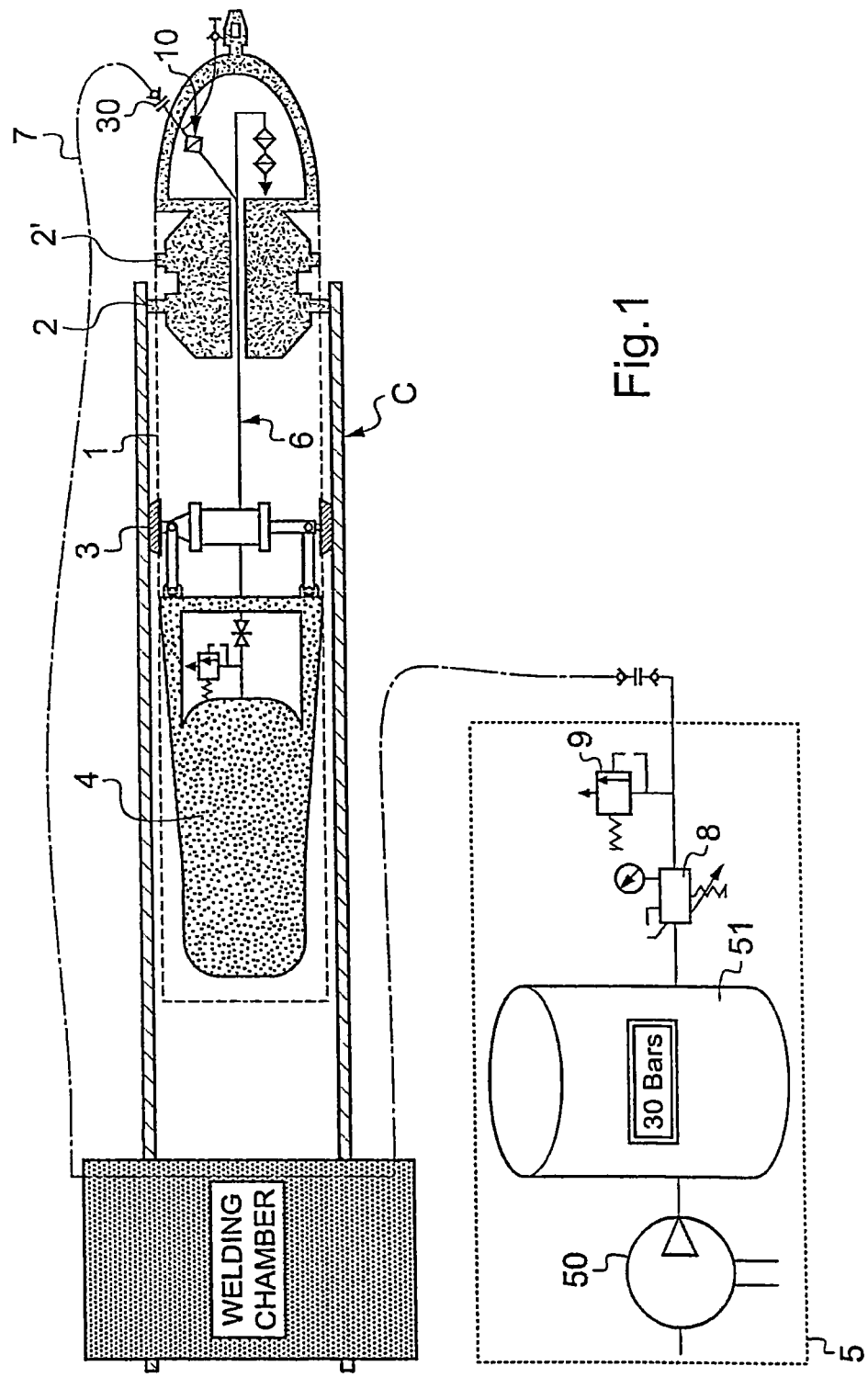
FIG. 1 shows a diagrammatic cross-section view of a device according to the invention when it is being replenished with compressed air.

The centering and clamping device according to the invention comprises an elongate cylinder 1 shown with dotted lines, that contains in particular the clamping means 2 as well as locking means 3 and possibly a motor system.

These clamping means are constituted by at least two series of clamping shoes 2, 2' that are placed on the entire periphery and arranged so as to project radially from said cylinder 1 so as to come into contact with the walls of the conduits C to be clamped.

Drive means are also provided for driving each series of clamping shoes 2, 2' between a position of projection from the cylinder and a position in which they are hidden in the cylinder, which drive means can be actuated by pneumatic control means.

These pneumatic control means comprise in particular a compressed air tank 4.

In addition, the cylinder 1 comprises, in the front portion, means 30 for connecting an external compressor unit 5 for the supply of compressed air to the tank 4 provided in said device. These connection means are of the rapid safety connection type.

This rapid safety connection preferably has an integral passageway diameter. These connection means are generally made up of two parts: a male fitting and a female fitting, one being mounted on the front part of the cylinder 1 and connected to a direct supply line 6 to the tank 4, with a large diameter without restriction, and the other being mounted at the end of a flexible pipe conduit 7 with a large diameter also without restriction, from the compressor unit 5.

The compressor unit 5 comprises an air compressor 50 and an external tank 51 which is fed by air from the air compressor 50, as illustrated in FIG. 1.

The compressor unit 5 is preferably a 30-bar compressor equipped with a pressure reducer 8 and a safety valve 9. The external tank 51 enables the tank 4 of the clamping and centering device to be refilled with air from the external tank 51 without the need to wait for the external tank 51 to be refilled.

A particle filter 10 is preferably provided on the direct supply line to the tank 4.

As mentioned above, the centering and clamping device according to the invention also comprises a control unit comprising a radio receiver. This radio receiver receives the control signals transmitted from a remote control unit 11. This control unit 11 therefore comprises a radio transmitter enabling control signals to be transmitted, which are chosen according to actuation buttons provided on the front of the unit 11.

Figure 2:
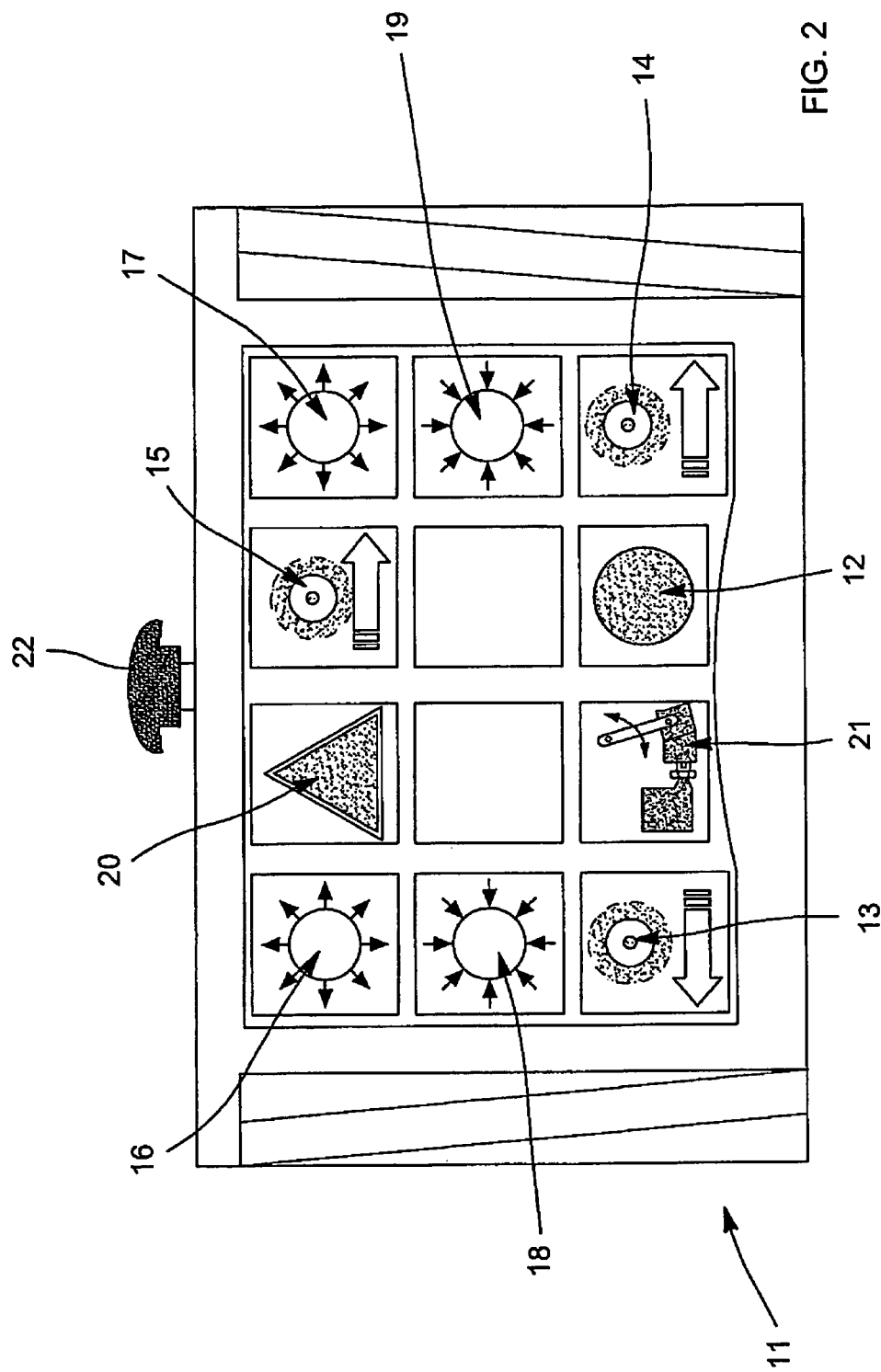
FIG. 2 shows a plan view of the remote control unit of the device according to FIG. 1.

As can be seen in FIG. 2, the control unit 11 comprises a start/stop button 12, two buttons 13 and 14 respectively enabling the backward and forward control of the device by pulses, as well as an automatic forward actuation button 15.

Two buttons 16 and 17 for controlling the deployment of two ramps of clamping shoes 2, 2' are provided, as well as two buttons 18, 19 for controlling the descent of said clamping shoe ramps 2, 2'.

Similarly, the unit 11 also comprises a brake release control button 20 as well as a strut release control button 21.

To ensure optimal safety, an emergency button 22 is also provided to enable all functions in progress to be stopped.

The invention is of course not limited to the examples described, but also encompasses all alternatives provided in the dependent claims.

The invention claimed is:

1. A device for centering and clamping tubular parts including conduits intended to form a pipeline, said tubular parts having respective inner cylindrical surfaces, said device comprising:
    an internal clamp to be inserted into one end of one of said tubular parts, the internal clamp including:
        an elongate cylinder body,
        a first clamping shoe and a second clamping shoe mounted into the elongate cylinder body and being pneumatically drivable to selectively move radially outwardly from the elongate cylinder body, and
        a compressed air tank housed into the elongate cylinder body at a rear end of the internal clamp and fluidly connected to the first clamping shoe and the second clamping shoe;
    an external compressor unit including an air compressor and an external tank fed by air from the air compressor;
    a detachable flexible fluid conduit connectable to a front end of the internal clamp that is configured to protrude from an end of one of the tubular parts, to selectively connect the external tank to the compressed air tank;
    wherein:
        i. the compressed air tank is refillable through the detachable fluid conduit with an amount of compressed air from the external tank without a need to wait for the air compressor to refill the external tank, and
        ii. said amount of compressed air in the compressed air tank drives the first and the second clamping shoes from a first position in which said shoes are hidden within said elongate cylinder body to a second position in which the shoes come into contact with the inner surface of one respective tubular part to be clamped, without a need to wait for the compressed air tank to be refilled; and
    said device does not comprise a rigid reach rod.

2. The device according to claim 1, wherein the internal clamp further includes:
    a first rapid coupling connector arranged at one end of said elongate cylinder body,
    an internal fluid conduit fluidly connecting said first rapid coupling connector to the compressed air tank, and
    the detachable flexible fluid conduit includes a second rapid coupling connector, the first rapid coupling connector and the second rapid coupling connector being mutually arranged so as to form a rapid coupling connection.

3. The device according to claim 2, wherein the rapid coupling connection, the internal fluid conduit and the detachable flexible fluid conduit provide a gas passageway from the external tank to the compressed air tank.

4. The device according to claim 1, wherein the internal clamp further includes:
    a drive device and said amount of compressed air in the compressed air tank further pneumatically actuates the drive device to move the internal clamp within one respective tubular part, from one end of said respective tubular part to the other end thereof, without the need to wait for the compressed air tank to be refilled.

5. The device according to claim 2, wherein the internal clamp further includes:
    a drive device and said amount of compressed air in the compressed air tank further pneumatically actuates the drive device to move the internal clamp within one respective tubular part, from one end of said respective tubular part to the other end thereof, without the need to wait for the compressed air tank to be refilled.

6. The device according to claim 3, wherein the internal clamp further includes:
    a drive device and said amount of compressed air in the compressed air tank further pneumatically actuates the drive device to move the internal clamp within one respective tubular part, from one end of said respective tubular part to the other end thereof, without the need to wait for the compressed air tank to be refilled.

7. The device according to claim 4, wherein the internal clamp further includes:
    a control unit configured to actuate at least one of the first clamping shoe and the second clamping shoe, the drive device and a locking device being included in the internal clamp.

8. The device according to claim 5, wherein the internal clamp further includes:

a control unit configured to actuate at least one of the first clamping shoe and the second clamping shoe, the drive device and a locking device being included in the internal clamp.

9. The device according to claim 6, wherein the internal clamp further includes:
a control unit configured to actuate at least one of the first clamping shoe and the second clamping shoe, the drive device and a locking device being included in the internal clamp.

10. The device according to claim 1, wherein the detachable flexible fluid conduit is directly connected to the external tank.

11. The device according to claim 1, wherein the detachable flexible fluid conduit is connected to the front end of the internal clamp only when the front end protrudes from the end of one of the tubular parts.

12. The device according to claim 8, wherein the control unit communicates with a remote control unit via radio control signals.

* * * * *